United States Patent [19]

Kim

[11] 4,015,833
[45] Apr. 5, 1977

[54] EXTRUDER SCREW
[75] Inventor: Heung Tai Kim, Avon Lake, Ohio
[73] Assignee: The B. F. Goodrich Company, Akron, Ohio
[22] Filed: Oct. 3, 1975
[21] Appl. No.: 619,510
[52] U.S. Cl. ............................................. 259/191
[51] Int. Cl.² ........................................ B29B 1/12
[58] Field of Search ............ 259/9, 10, 25, 26, 45, 259/46, 97, 191, 192, 193, 194, 195; 198/213; 416/176, 177; 425/207, 208, 209

[56] References Cited
UNITED STATES PATENTS 3,287,477  11/1966  Vesilind ........................ 425/208 X
3,344,215  9/1967   DeWitz et al. ................. 425/209 X
3,484,507  12/1969  Smith ............................ 425/209 X
3,762,692  10/1973  Schippers ...................... 259/191
3,780,994  12/1973  Kneller et al. ................. 259/191
3,788,612  1/1976   Dray ............................. 259/191 X Primary Examiner—Philip R. Coe
Attorney, Agent, or Firm—Joseph Januszkiewicz; W. A. Shira, Jr.

[57] ABSTRACT

An extruder screw having an elongated core with helical flights with a plurality of axially spaced shear rings along the length thereof. The shear rings have radial slots that extend axially through the shear rings. The length and width of the slots vary in dimension.

6 Claims, 6 Drawing Figures

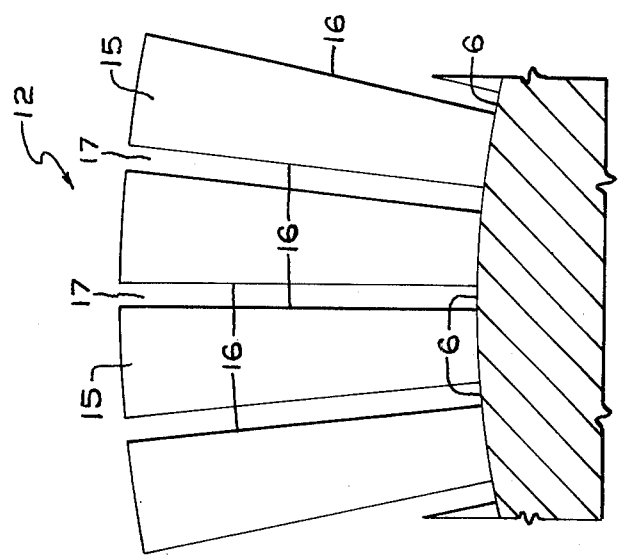
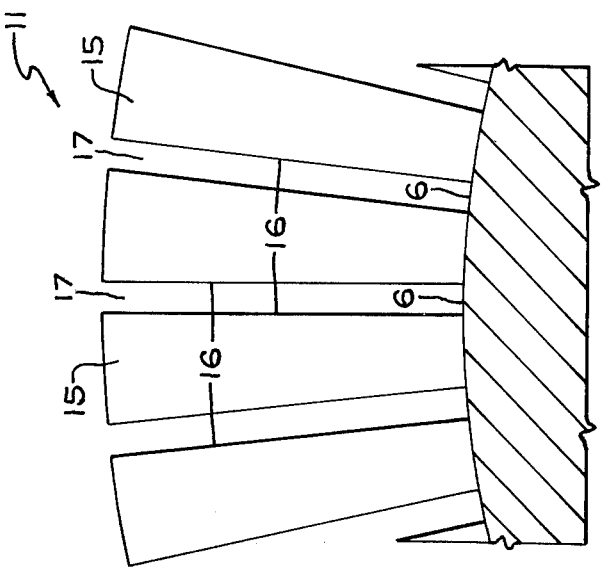
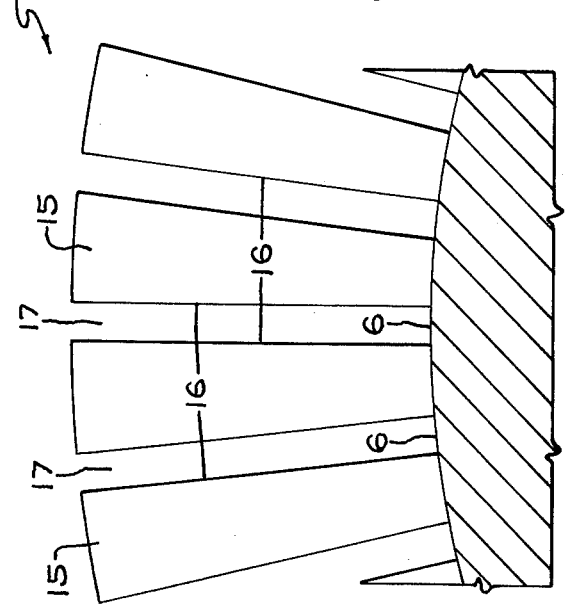

EXTRUDER SCREW

BACKGROUND OF THE INVENTION

This invention relates to an improved extruder and more particularly to a new and improved extruder screw for plasticizing plastic materials such as polyurethanes.

The mixing and working of plasticizing materials with extruder screws have been directed to increasing their efficiency by improving the overall efficiency of the screw design for general purpose work. The design changes have been generally in the flight configuration or pitch design. To increase the working of the plastic material, improvements have been directed to leading off the fluent material as well as to providing a series of mixing pins to provide a more thorough mixing. The present invention is directed to providing a novel means for increasing shear while simultaneously increasing heat transfer and altering the flow pattern to enhance mixing and to reduce temperature fluctuation across the screw channel which improves the quality and quantity of the mixed product.

SUMMARY OF THE INVENTION

The present invention is directed to a new and improved screw design that has a series of flights which cooperate with a plurality of axially spaced shear rings, which rings have slits throughout the circumference thereof. The slits extend from the periphery of the ring to the root of the screw channel. The slits in the rings provide a restriction to the flow of the material being worked which increases the shearing action and improving the processing of the unmelted particles which are thus sheared into smaller particles. This action increases the heat generated and improves the heat transfer to the material being processed, thereby providing a much more uniform temperature profile than heretofore obtained within the melt.

BRIEF DESCRIPTION OF THE DRAWINGS

FIG. 4 is an enlarged fragmentary cross-sectional view showing a portion of one of the shear rings with the fins in full, similar to FIG. 2.

FIG. 5 is an enlarged fragmentary cross-sectional view showing a portion of a second shear ring with the fins in full.

FIG. 6 is an enlarged fragmentary cross-sectional view showing a portion of a third shear ring with the fins in full.

DETAILED DESCRIPTION

Figure 1:
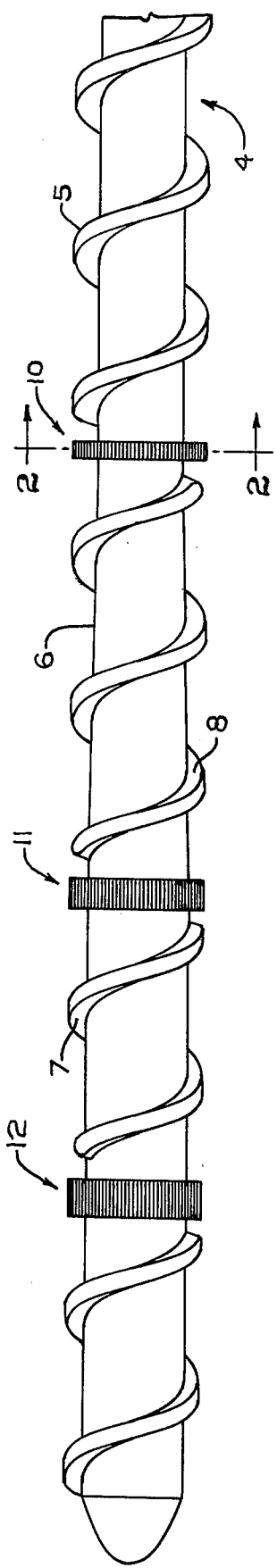
FIG. 1 is a side elevational view of an extruder screw showing flights having a plurality of axially spaced shear rings.
Figure 2:
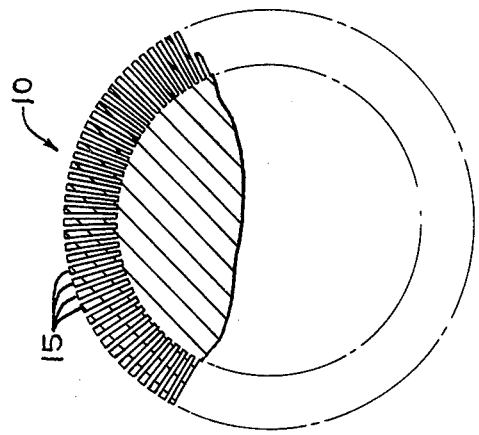
FIG. 2 is a cross sectional view taken along line 2—2 of FIG. 1 with a portion of the shear ring shown in full.
Figure 3:
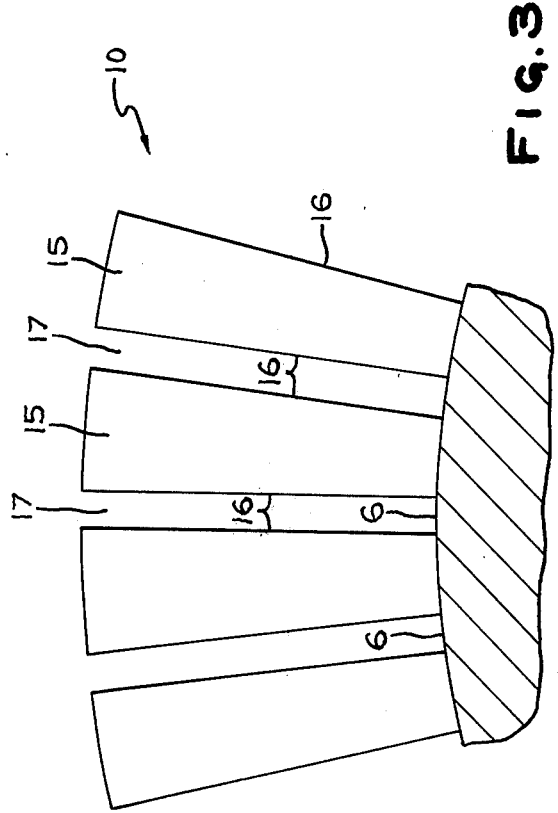
FIG. 3 is an enlarged front fragmentary view of a portion of the extruder screw with a portion of the shear ring in full.

Referring to the drawings, wherein like reference characters designate like or corresponding parts throughout the several views, there is shown in FIG. 1 a feed screw 4 having a flight 5 of constant pitch, although other types of flights, such as dual flights, and other pitches may be used. The diameter of the core 6 of the extruder screw is shown as of uniform dimension, however, it is contemplated that the invention may be applied to cores of varying diameters. The flight 5 has a leading edge 7 and a trailing edge 8.

Axially spaced along the length of the extruder feed screw 4 are a plurality of shear rings 10, 11 and 12. The shear rings are identical in construction except that their axial length and the dimension of the slits in the respective shear rings are different, accordingly only one shear ring will be described. Shear ring 10 has a plurality of radially extending fins 15 that extend radially outwardly from the core 6 of the extruder. Each fin 15 has a pair of side portions 16 such that a pair of adjacent fins define a groove 17 between adjacent side portions 16. Groove 17 extends radially outwardly from the outer surface of the core 6 of the feed screw 4 to the peripheral surface of the shear ring 10.

The axial lengths of the respective fins 15 or the grooves 17 of the respective shear rings 10, 11 and 12 are longer as one goes towards the forward end or torpedo end of the feed screw. It is contemplated that these lengths of the fins 15 may be constant for the different rings, however, in the processing of materials that is not highly heat sensitive, it has been found desirable to increase the axial length of the fins which in turn increases the length of the respective grooves 17.

Another variable in the respective shear rings 10, 11 and 12 is to make the width of the respective slits decrease in size as one moves in the forward direction of the feed screw. The progressive reduction in size of the openings in the shear rings or the reduction in width of the slits 17 progressively increases the shear as well as heating of the compound being processed.

In the operation of the extruder feed screw 4, the material being processed moves up the channel of the feed screw by the interaction of the flight 5 on the material and as the material reaches the first shear ring 10, the material is forced therethrough by the pressure exerted from the following material due to the rotation of the screw and its flights. As the material is moved through the slits 17, the unmelted particles of the material being processed is sheared into smaller particles. The frictional heat generated by such action aids in the melting of the unfluxed particles. With such shear rings, the flow pattern is altered thereby enhancing mixing and reduces temperature fluctuation across the channel. With the slits smaller as one moves towards the forward portion of the feed screw 4, the amount of heat generated can be increased. The amount of frictional heat generated is proportional to the number of slits and a large number of slits can be installed in a given section of a screw to enable it to generate a controlled amount of heat which can be transferred efficiently to the plastic materials minimizing temperature fluctuation of the material being processed because the thickness of the plastic film in the slits is very thin providing effective heat transfer. It has been found that not only the width and length of the slit openings affect the quality of the extrudate, but also the number of shear rings in a given screw affect the final quality of the extrudate. As an example, an extruder feed screw having a 2½ inch diameter screw with a length of 24:1 L/D, three slit rings are very effective to increase quantity and quality of mix by having the slits of the first ring four hundredths of an inch, with the slits of the second ring 35 thousandths of an inch, and the slits of the third shear ring being 25 thousandths of an inch.

Various modifications are contemplated and may obviously be resorted to by those skilled in the art without departing from the described invention, as hereinafter defined by the appended claims, as only a preferred embodiment thereof has been disclosed.

I claim:

1. An extruder feed screw having a core extending longitudinally thereof, said core supporting helical flight means for advancing material from the rear portion thereof to the forward portion thereof, said feed screw having a plurality of axially spaced shear rings, each of said shear rings having a plurality of slits extending from said core outwardly to the periphery of said rings, said slits being linear and longitudinally extending, and the axial length of said shear rings being greater in the direction of the forward portion of said feed screw relative to an adjacent shear ring that is disposed rearwardly thereof considering the feed of the material processed by said feed screw is from the rear portion to the forward portion of the feed screw.

2. An extruder feed screw as set forth in claim 1, wherein the number of shear rings is between 2 and 5.

3. An extruder feed screw as set forth in claim 2, wherein said slits define a plurality of circumferentially spaced fins that extend radially outwardly from said core, and said fins being trapezoidal in cross-section.

4. An extruder feed screw as set forth in claim 1 wherein the width of said slits decrease in the width of their dimension relative to slits of adjacent shear rings disposed rearwardly thereof.

5. An extruder feed screw having a core extending longitudinally thereof, said core having helical flight means for advancing material therealong, said feed screw having three axially spaced shear rings along the length thereof, one of said shear rings being located adjacent to one end of said feed screw, another one of said shear rings being located towards the other end of said feed screw, the remaining one of said shear rings located intermediate of said one shear ring and the said other one of said shear rings, each of said shear rings having axially extending slits that extend from said core radially outwardly to the upper outer periphery of said shear rings, said slits of said one shear ring being of narrower width than the slits of either one of said slits on said other shear ring or said remaining shear ring, the slits on said remaining shear ring being of narrower width than the slits of said other shear ring, and the axial length of said one shear ring is longer than the axial length of said remaining shear ring, and the axial length of said remaining shear ring is longer in dimension than the axial length of said other shear ring.

6. An extruder feed screw as set forth in claim 5, wherein said slits on said shear rings define a plurality of circumferentially spaced fins that are quadrilateral in cross-section.

* * * * *